(12) United States Patent
Shiina et al.

(10) Patent No.: US 11,411,646 B2
(45) Date of Patent: Aug. 9, 2022

(54) OPTICAL-RF HYBRID WIRELESS COMMUNICATION SYSTEM AND CONTROL METHOD

(71) Applicant: NIPPON TELEGRAPH AND TELEPHONE CORPORATION, Tokyo (JP)

(72) Inventors: Ryota Shiina, Musashino (JP); Kazutaka Hara, Musashino (JP); Satoshi Ikeda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/274,383

(22) PCT Filed: Aug. 27, 2019

(86) PCT No.: PCT/JP2019/033475
§ 371 (c)(1),
(2) Date: Mar. 8, 2021

(87) PCT Pub. No.: WO2020/054394
PCT Pub. Date: Mar. 19, 2020

(65) Prior Publication Data
US 2021/0344422 A1 Nov. 4, 2021

(30) Foreign Application Priority Data
Sep. 10, 2018 (JP) .............................. JP2018-168639

(51) Int. Cl.
*H04B 10/112* (2013.01)
*H04B 10/114* (2013.01)
(Continued)

(52) U.S. Cl.
CPC ......... *H04B 10/1123* (2013.01); *H04B 10/03* (2013.01); *H04B 10/07953* (2013.01); *H04B 10/1143* (2013.01)

(58) Field of Classification Search
CPC .............................................. H04B 10/11–118
(Continued)

(56) References Cited

U.S. PATENT DOCUMENTS 5,946,120 A * 8/1999 Chen ...................... H04B 10/11
398/155
6,928,248 B2 * 8/2005 Achour ................ H04B 10/032
398/115
(Continued)

FOREIGN PATENT DOCUMENTS

JP 2005506718 A 3/2005
JP 201161253 A 3/2011
(Continued)

OTHER PUBLICATIONS

Akira Yamada et al., Trends in international standardization of wireless LAN related systems, Institute of Electronics, Information and Communication Engineers Communication Society Magazine, No. 38, Autumn issue, 2016, pp. 74-79.
(Continued)

*Primary Examiner* — Li Liu (57) ABSTRACT

The purpose of the present invention is to provide an optical/RF wireless hybrid communication system and a control method capable of solving the instability of link conditions of an RF wireless link and an optical wireless link. In the optical/RF wireless hybrid communication system and the control method according to the present invention, links for data transmission are not limited to one of an RF wireless link and an optical wireless link, the quality of link conditions is determined from signal quality received through channels of both the RF wireless link and the optical (Continued)

wireless link, and the distribution of data to be transmitted through the respective links is determined on the basis of the determination result. Thus, the links can be flexibly switched depending on the transmission conditions such as disturbance.

10 Claims, 6 Drawing Sheets

(51) Int. Cl.
    *H04B 10/03* (2013.01)
    *H04B 10/079* (2013.01)
(58) Field of Classification Search
    USPC .................................................. 398/115–117
    See application file for complete search history.

(56) References Cited

U.S. PATENT DOCUMENTS

| | | | | |
|---|---|---|---|---|
| 7,274,876 | B2* | 9/2007 | Gerszberg | H04B 10/1123 |
| | | | | 398/115 |
| 8,923,701 | B2* | 12/2014 | D'Errico | H04B 10/032 |
| | | | | 398/115 |
| 10,727,949 | B2* | 7/2020 | Kay | H04B 7/18504 |
| 11,115,119 | B1* | 9/2021 | Lee | H04B 7/18526 |
| 2002/0122230 | A1* | 9/2002 | Izadpanah | H04B 10/1121 |
| | | | | 398/115 |
| 2002/0122231 | A1* | 9/2002 | Verbana | H04B 10/1121 |
| | | | | 398/115 |
| 2004/0037566 | A1* | 2/2004 | Willebrand | H04B 10/1123 |
| | | | | 398/115 |
| 2004/0062551 | A1* | 4/2004 | ElBatt | H04B 10/1121 |
| | | | | 398/115 |
| 2012/0068880 | A1* | 3/2012 | Kullstam | H01Q 3/26 |
| | | | | 342/54 |
| 2017/0257265 | A1 | 9/2017 | Hong et al. | |
| 2018/0191431 | A1* | 7/2018 | Moision | H04L 1/1809 |
| 2018/0269972 | A1* | 9/2018 | Djordjevic | H04B 10/2575 |
| 2019/0261262 | A1* | 8/2019 | Stiles | H04W 48/18 |
| 2021/0266071 | A1* | 8/2021 | Shiina | H04W 24/02 |

FOREIGN PATENT DOCUMENTS

| | | | | |
|---|---|---|---|---|
| JP | 2011061253 | * | 3/2011 | H04W 48/18 |
| JP | 201182672 | A | 4/2011 | |
| JP | 2011082672 | * | 4/2011 | H04W 74/08 |
| JP | 2011199883 | A | 10/2011 | |

OTHER PUBLICATIONS

Mengjie Zhang et al., 4.05-GB/s RGB LED-based VLC system utilizing PS-Manchester coded Nyquist PAM-8 modulation and hybrid time-frequency domain equalization, OFC2017, 2017.

Wen-Shing Tsai et al., A 50 m/320 Gbps DWDM FSO communication, IEEE Photonics Conference (IPC), 2016, pp. 43-44.

* cited by examiner

LINK INFORMATION IN WHICH SIGNAL QUALITY IS REPRESENTED
BY 5 BITS AND MEASUREMENT PARAMETER IS REPRESENTED BY 3 BITS

| 0 | 1 | 0 | 0 | 0 | 1 | 0 | 0 |

MEASUREMENT PARAMETER
Ex)001=CNR

SIGNAL QUALITY
(OPTICAL WIRELESS LINK)

SIGNAL QUALITY
(RF WIRELESS LINK)

Fig. 5

| SIGNAL QUALITY | MEASUREMENT PARAMETER | | | |
|---|---|---|---|---|
| | 01 | 10 | 11 | ... |
| | CNR[dB] | MER[dB] | EVM[%] | ... |
| 000 | CNR≧40 | MER≧42 | EVM≦0.2 | ... |
| 100 | 35≦CNR<40 | 37≦MER<42 | 0.2<EVM≦0.5 | ... |
| 010 | 30≦CNR<35 | 32≦MER<37 | 0.5<EVM≦1 | ... |
| 011 | 25≦CNR<30 | 27≦MER<32 | 0.7<EVM≦0.5 | ... |
| ... | ... | ... | ... | ... |
| 111 | CNR<10 | MER<12 | EVM≧10 | ... |

Fig. 6

| LINK INFORMATION OPTICAL | RF | k=10 | | k=5 | |
|---|---|---|---|---|---|
| | NUMBER OF OPTICAL WIRELESS FRAMES | NUMBER OF RF WIRELESS FRAMES | NUMBER OF OPTICAL WIRELESS FRAMES | NUMBER OF RF WIRELESS FRAMES |
| 000\|000 | 5 | 5 | 3 | 2 |
| 010\|000 | 4 | 6 | 2 | 3 |
| 011\|000 | 4 | 6 | 2 | 3 |
| ... | ... | ... | ... | ... |
| 111\|000 | 0 | 10 | 0 | 5 |

OPTICAL-RF HYBRID WIRELESS COMMUNICATION SYSTEM AND CONTROL METHOD

CROSS-REFERENCE TO RELATED APPLICATIONS

This application is a 371 U.S. National Phase of International Application No. PCT/JP2019/033475, filed on Aug. 27, 2019, which claims priority to Japanese Application No. 2018-168639 filed on Sep. 10, 2018. The entire disclosures of the above applications are incorporated herein by reference.

TECHNICAL FIELD

The present disclosure relates to an optical/RF wireless hybrid communication system for transmitting data by channels of an RF wireless link and an optical wireless link, and a control method therefor.

BACKGROUND ART

High-speed Internet services using fiber-to-the-home (FTTH) and long term evolution (LTE) are essential tools in daily lives. Particularly in recent years, a wide variety of applications and services such as IP data communications, Internet of Things (IoT)/machine to machine (M2M), 4K/8K high-definition video distribution services, online video distribution services, and video uploading through SNS have rapidly become widespread due to the popularization of cloud use and the spread use of mobile terminals. In addition, new workstyles such as teleworking with ICT have been proposed, and the demand for network-based services is expected to grow in the future. At present, stable optical broadband services are provided to homes owing to the popularization of FTTH, but wireless communication systems for achieving high throughput have been sought after in home environments from the viewpoint of utilization of multiple devices other than PCs and routing of cables and against the background of diversity of services described above.

Wireless communication systems can be roughly divided into two types across 3 THz from the viewpoint of frequency regions. The frequency band of 3 THz or lower is called "radio region", and includes cellular systems such as LTE and 5G and wireless LANs that use unlicensed bands. Research and development in this region are active, and high throughput can be achieved by extending a frequency band used or using a high frequency band. Regarding the extension of the frequency band, there is a report that high throughput is achieved by, for example, using frequency bands of 2.4 GHz and 5.2 GHz and taking advantage of advanced technologies such as multi-level modulation, control of sub-carrier spacing, and MIMO technology, which transmits and receives data with a plurality of antennas (NPL 1). Regarding the use of high frequency bands, the Ministry of Internal Affairs and Communications has permitted the use of the 60 GHz band, and in recent years, wireless LAN standards utilizing the millimeter wave band, such as IEEE 802.11ad, which are not bound by the Radio Act, have been standardized. However, concerns over power consumption and high cost of devices in the millimeter wave band have raised the bar for the rapid spread of millimeter wave wireless LAN standards in the future.

The frequency band of 3 THz or higher (30 PHz or lower) is, on the other hand, called "optical wave region", and includes methods using infrared communication and visible light and Li-Fi, which transmits and receives by means of high-speed modulation of LEDs recently used in lighting. The frequency band in this region is high, and hence it is relatively easy to achieve high throughput with a simple transmission reception configuration using the intensity modulation-direct detection (IM-DD). At the research level, transmission experiments of 1 m/4 Gbps using wavelength division multiplexing (WDM) by LEDs, which are incoherent light, and 8PAM and of 50 m/320 Gbps by 8-wavelength dense WDM (DWDM) at 50 GHz intervals using coherent light have been reported (NPL 2 and NPL 3).

CITATION LIST

Patent Literature

[PTL 1] Japanese Translation of PCT Application No. 2005-506718

Non Patent Literature

[NPL 1] Akira Yamada, Daisuke Nojima, Takahiro Asai, "Musen LAN Kanren Sisutemu no Kokusai Hyoujunka Doukou (Trend of International Standardization of Wireless LAN-based Systems)", IEICE Communication Society Magazine, No. 38, Autumn, pp. 74-79, 2016.
[NPL 2] Mengjie Zhang, Meng Shi, Fumin Wang, Jiaqi Zhao, Yingjun Zhou, Zhixin Wang, Nan Chi, "4.05-Gb/s RGB LED-based VLC system utilizing PS-Manchester coded Nyquist PAM-8 modulation and hybrid time-frequency domain equalization", Proc OFC2017, W2A.42.
[NPL 3] Wen-Shing Tsai, Hai-Han Lu, Chung-Yi Li, Ting-Chieh Lu, Hung-Hsien Lin, Bo-Rui Chen, Chang-Jen Wu, "A 50 m/320 Gbps DWDM FSO communication", IEEE Photonics Conference (IPC), pp. 43-44, 2016.

SUMMARY OF THE INVENTION

Technical Problem

In the wireless communication systems in the radio wave region and the optical wave region, the throughput can be expected to increase by the above-mentioned method, but the respective wireless communication systems are considered to have the following problems from the viewpoint of stability of communication conditions of wireless links.
(Problems Due to Use of Frequency Band in Radio Wave Region)
Deterioration in communication quality due to multipath fading
Reduction in throughput due to radio interference
(Problem Due to Use of Frequency Band in Optical Wave Region)
Propagation through obstacles is impossible (communication is disconnected when an obstacle is present in a path)

These problems can be overcome by a hybrid wireless communication system in which wireless communication systems using the frequency bands in the radio wave region and the optical wave region cooperate with each other. The specific problems and solutions are as follows.
(Problems Due to Use of Frequency Band in Radio Wave Region and Solutions)
Deterioration in communication quality due to multipath fading
(Optical wave region) Using characteristics that directivity is extremely high Reduction in throughput due to radio interference

(Optical wave region) Using characteristics that crosstalk due to optical wave interference is low (Problem Due to Use of Frequency Band in Optical Wave Region and Solution)

Propagation through obstacles is impossible (communication is disconnected when an obstacle is present in a path)

(Radio wave region) Using diffraction effect and transmission of radio waves although depending on a frequency band used As described above, when only a wireless communication system in the radio wave region or the optical wave region is used, the communication conditions become unstable due to the above-mentioned problems, but the disadvantages (above-mentioned problems) of one system are complemented by the advantages of the other system so that stable wireless links independently from the radio conditions and the communication bandwidth can be constructed. The above-mentioned hybrid wireless communication system is effective from the viewpoint of securing frequency resources in the radio wave region by using a frequency band in the optical wave region, which is not affected by limitation of the Japanese Radio Law.

Such hybrid communication systems using the frequency bands in the radio wave region and the optical wave region have already been proposed. PTL 1 discloses RF and optical wireless hybrid communication links provided with functions for monitoring weather forecast, a weather device in a controller, or transmission/reception power to determine the quality of the respective link conditions. In PTL 1, however, the state of each wireless link is determined from transmission/reception power, but, for example, the above-mentioned multipath fading may result in reduction in throughput because signals interfere with each other due to the propagation of different paths, which can significantly fluctuate reception intensity. Signal quality deterioration due to waveform distortion (jitter) caused by radio/optical wave arrival time different (transmission delay variation) may also be considered. Thus, the quality of the link conditions cannot be determined simply by transmission/reception power of each link. Further, PTL 1 indicates that after the conditions of the links are determined by the above-mentioned method, whether the link is an RF wireless link or an optical wireless link is uniquely determined and the determined link is used. This indicates that only one of the RF wireless link and the optical wireless link is used for data transmission, and does not solve the instability of the link conditions caused by the above-mentioned problems.

It is therefore an object of the present invention to provide an optical/RF wireless hybrid communication system and a control method capable of solving the instability of link conditions of an RF wireless link and an optical wireless link.

Means for Solving the Problem

In order to achieve the above-mentioned object, an optical/RF wireless hybrid communication system according to the present invention determines quality of link conditions from signal quality received through channels of both an RF wireless link and an optical wireless link, and decides distribution of data to be transmitted through the respective links on the basis of the determination result.

Specifically, an optical/RF wireless hybrid communication system according to the present invention for transmitting frames by using channels of an RF wireless link and an optical wireless link includes:

a block formation unit for forming blocks of a predetermined number of frames as one piece of data;

a signal quality measurement unit for measuring signal quality of frames transmitted through the channel of the RF wireless link and signal quality of frames transmitted through the channel of the optical wireless link;

a distribution determination unit for determining, on the basis of the signal quality measured by the signal quality measurement unit, a distribution ratio of the frames transmitted through the channel of the RF wireless link and the frames transmitted through the channel of the optical wireless link in the data; and a distribution unit for dividing the data into two pieces on the basis of the distribution ratio determined by the distribution determination unit, and distributing one frame group to the channel of the RF wireless link and the other frame group to the channel of the optical wireless link or distributing all frame groups in the data to the channel of the RF wireless link and the channel of the optical wireless link.

A control method according to the present invention for an optical/RF wireless hybrid communication system for transmitting data by using channels of an RF wireless link and an optical wireless link includes:

a block formation procedure for forming blocks of a predetermined number of frames as one piece of data;

a signal quality measurement procedure for measuring signal quality of data transmitted through the channel of the RF wireless link and signal quality of data transmitted through the channel of the optical wireless link;

a distribution determination procedure for determining, on the basis of the signal quality measured in the signal quality measurement procedure, a distribution ratio of data transmitted through the channel of the RF wireless link and data transmitted through the channel of the optical wireless link in the data; and a distribution procedure for dividing the data into two pieces on the basis of the distribution ratio determined by the distribution determination procedure, and distributing one frame group to the channel of the RF wireless link and the other frame group to the channel of the optical wireless link or distributing all frame groups in the data to the channel of the RF wireless link or the channel of the optical wireless link.

The optical/RF wireless hybrid communication system and the control method therefor according to the present invention form blocks of frames input during data transmission for each predetermined number k of frames, and measure, for each blocked frame group, received signal quality in channels of both the RF wireless link and the optical wireless link, and distribute the frame group to the RF wireless link or the optical wireless link on the basis of the measurement result. Thus, the links can be flexibly switched depending on the transmission conditions such as disturbance. Consequently, the present invention can provide an optical/RF wireless hybrid communication system and a control method capable of solving the instability of link conditions of an RF wireless link and an optical wireless link.

The optical/RF wireless hybrid communication system and the control method therefor according to the present invention add, to a head of the frame group, control information used for the distribution unit to distribute the frame group to the channel of the RF wireless link and the channel of the optical wireless link. The signal quality measurement unit detects the control information, and changes a frequency to measure signal quality of a frame on the basis of the distribution ratio. The frequency to measure the signal quality can be reduced by the distribution ratio.

Further, in the optical/RF wireless hybrid communication system and the control method therefor according to the present invention, it is preferred that, in bidirectional communication, one direction be capable of transmitting the data while distributing the data to the channels of both the RF wireless link and the optical wireless link, and the other direction transmit the data through only the RF wireless link.

By using optical/RF wireless hybrid communication for only a downlink direction in bidirectional communication between a master station and a terminal, the need of disposing an optical transmitter for uploading on the terminal can be eliminated to reduce the cost.

Effects of the Invention

According to the present invention, in the RF/optical wireless hybrid communication type in which the RF wireless communication type and the optical wireless communication type are blended to secure frequency resources in a radio wave region in a wireless transmission section and increase the throughput, the quality of link conditions is determined from signal quality received through channels of both the RF wireless link and the optical wireless link, and the distribution of data to be transmitted through the respective links is determined on the basis of the determination result.

Consequently, the present invention can provide an optical/RF wireless hybrid communication system and a control method capable of solving the instability of link conditions of the RF wireless link and the optical wireless link.

DESCRIPTION OF EMBODIMENTS

Referring to the accompanying drawings, embodiments of the present invention are described. The embodiments described below are examples of the present invention, and the present invention is not limited to the following embodiments. Note that components with the same reference symbols in this specification and the drawings indicate the same components.

First Embodiment

Figure 1:
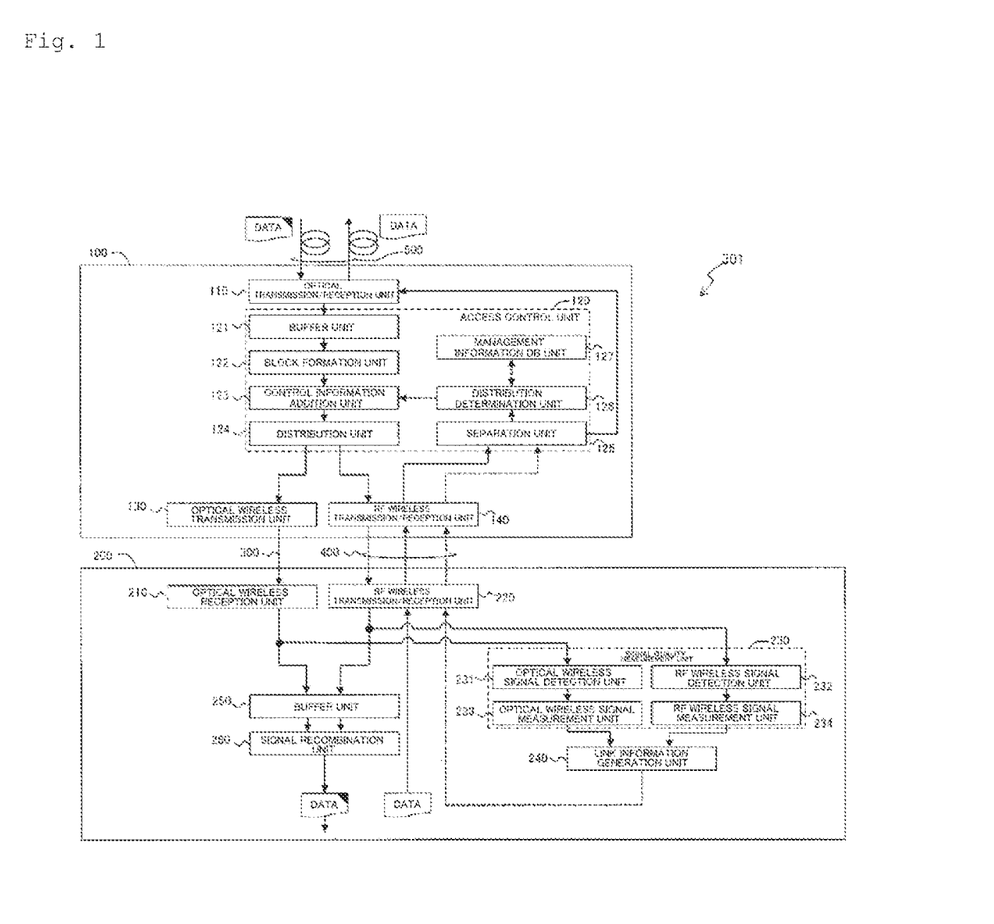
FIG. 1 is a diagram for describing an optical/RF wireless hybrid communication system according to the present invention.

FIG. 1 is a diagram for describing an optical/RF wireless hybrid communication system 301 in this embodiment. In FIG. 1, reference symbol "1xx" denotes an apparatus/device installed on the master station side, and reference symbol "2xx" denotes an apparatus/device installed on the terminal side. The optical/RF wireless hybrid communication system 301 is an optical/RF wireless hybrid communication system for transmitting frames by using channels of an RF wireless link 400 and an optical wireless link 300, and includes a block formation unit 122, a signal quality measurement unit 230, a distribution determination unit 126, and a distribution unit 124.

The block formation unit 122 forms blocks of a predetermined number of frames as one piece of data.

The signal quality measurement unit 230 measures signal quality of frames transmitted through the channel of the RF wireless link 400 and signal quality of frames transmitted through the channel of the optical wireless link 300.

The distribution determination unit 126 determines, on the basis of the signal quality measured by the signal quality measurement unit 230, a distribution ratio of the frames transmitted through the channel of the RF wireless link 400 and the frames transmitted through the channel of the optical wireless link 300 in the data.

The distribution unit 124 divides the data into two pieces on the basis of the distribution ratio determined by the distribution determination unit 126, and distributes one frame group to the channel of the RF wireless link 400 and the other frame group to the channel of the optical wireless link 300 or distributes all frame groups in the data to the channel of the RF wireless link 400 or the channel of the optical wireless link 300.

The optical/RF wireless hybrid communication system 301 further includes a control information addition unit 123. The control information addition unit 123 adds, to the head of the frame group, control information used for the distribution unit 124 to distribute the frame group to the channel of the RF wireless link 400 and the channel of the optical wireless link 300.

300 represents an optical wireless link for transmitting and receiving data between a master station and a terminal by using a frequency band in an optical wave region. 400 represents an RF wireless link for transmitting and receiving data between the master station and the terminal by using a frequency band (hereinafter referred to as "RF wireless frequency band") in a radio wave region. 100 represents the master station. 110 represents an optical transceiver for receiving an optical signal in a downlink direction transmitted from a host station such as a relay station to the master station through a fiber transmission line 500, or transmitting uplink data transmitted from the terminal side to the host station with an optical signal. 120 represents an access control unit, which includes a buffer unit 121, the block formation unit 122, the control information addition unit 123, the distribution unit 124, a data separation unit 125, the distribution determination unit 126, and a management information DB unit 127. The block formation unit 122 forms blocks of a plurality of packets as one piece of data. The control information addition unit 123 adds control information for distributing blocked data to the RF wireless link or the optical wireless link. The distribution unit 124 distributes data to the RF wireless link or the optical wireless link on the basis of the control information added by the control information addition unit 123. The data separation unit 125 separates multiplied uplink data and link information indicating the state of the link from each other. The distribution determination unit 126 determines a distribution ratio of data to the RF wireless link and the optical wireless link. The management information DB unit 127 stores therein in advance a table of the number of frames to be distributed depending on the states of signal quality of the RF wireless link and the optical wireless link. 130 represents an optical wireless link-side transmission unit, and 140 represents an RF wireless link-side transmission/reception unit.

On the other hand, 200 represents the terminal, 210 represents a reception unit on the optical wireless link 300 side, 220 represents a transmission/reception unit on the RF wireless link 400 side, and 230 represents the signal measurement unit for tapping a part of signals output from the optical wireless reception unit 210 and the RF wireless transmission/reception unit 220, and measuring signal quality of the received signals. The signal measurement unit 230 includes an optical wireless-side signal detection unit 231, an RF wireless-side signal detection unit 232, an optical wireless signal measurement unit 233, and an RF wireless signal measurement unit 234. 240 represents a link information generation unit for generating link information from measurement values measured by the signal measurement unit 230. 250 represents a buffer unit, and 260 represents a signal recombination unit for reconstructs reception data received by using each of the optical wireless link and the RF wireless link in accordance with the division rule in the access control unit 120.

Next, the flow of data and control data is described. The following is a case where frames such as Ethernet (registered trademark) are assumed as a specific example of data described in this example. The present invention is applicable to other cases.

Figure 2:
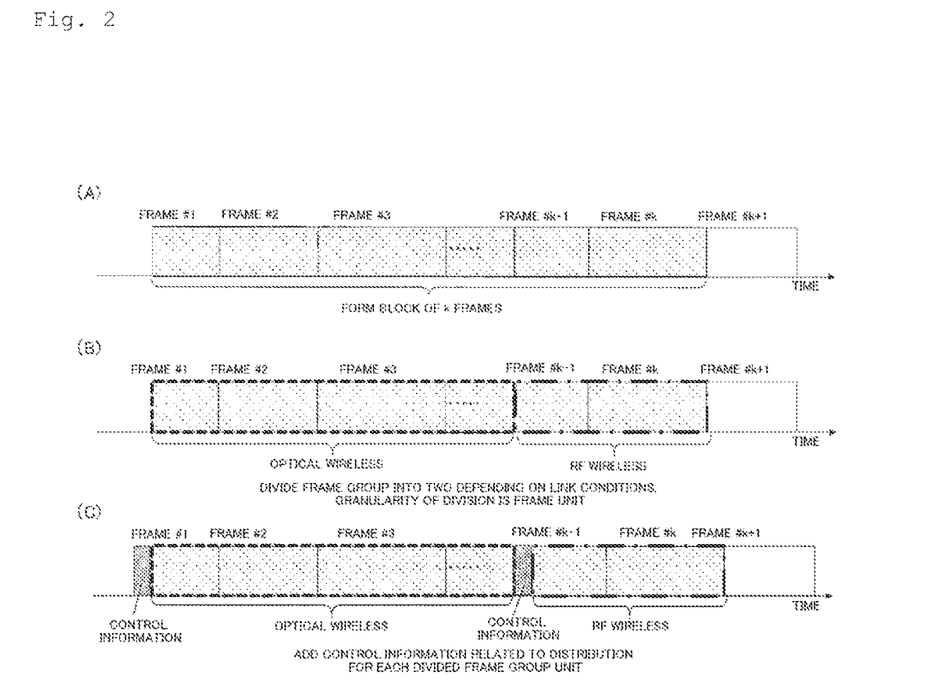
FIG. 2 is a diagram for describing block formation of frames and control data addition performed by the optical/RF wireless hybrid communication system according to the present invention.

Frames transmitted to the master station 100 through the fiber transmission line 500 are received by the optical transceiver 110 as an optical signal, and converted into an electric signal. The converted signal is subjected to buffering in the buffer unit 121, and formed into blocks for every freely determined number of frames in the block formation unit 122. FIG. 2(A) illustrates a conceptual diagram of the block formation. As an example, the case where k frames are a unit block is illustrated (hereinafter data obtained by forming a block of a plurality of frames is referred to as "blocked data"). Blocked data is input to the control information addition unit 123. The control information addition unit 123 divides the blocked data into two pieces on the basis of distribution information as illustrated in FIG. 2(B) and FIG. 2(C), and adds control information for the distribution to the head of the divided frame group. The distribution information is transmitted from the distribution determination unit 126. In the control information, an identifier for identifying an optical wireless link or an RF wireless link, an identifier of blocked data, the number of frames constituting the blocked data, the number of frames distributed to the optical wireless link or the RF wireless link, and other information are described.

FIG. 2 illustrates an example in which k frames are blocked and formed into blocked data (FIG. 2(A)), the blocked data is divided into two pieces (FIG. 2(B)), control information is added to the heads of a frame #1 and a frame #k-1 (FIG. 2(C)), and the frame #1 to a frame #k-2 are distributed to the optical wireless link and the frame #k-1 to a frame #k are distributed to the RF wireless link. To generalize, when it is assumed that the number of frames constituting blocked data is k and n frames ($0 \leq n \leq k$) of the frames are distributed to the optical wireless link, the frame positions to insert the control information are the head of a frame group from the frame #1 to the frame #n and the head of a frame #n+1. In this case, the distribution ratio of the frames can be defined as "optical wireless:RF wireless=n: k−n".

The frames added with the control information are distributed by the distribution unit 124 to the optical wireless link and the RF wireless link on the basis of the control information. The optical wireless transmission unit 130 and the RF wireless transmission/reception unit 140 transmit the frames distributed from the distribution unit 124 to the terminal 200 through the optical wireless link 300 and the RF wireless link 400, respectively.

The transmitted frames are converted by the optical wireless reception unit 210 and the RF wireless transmission/reception unit 220 in the terminal 200 into electric signals, and are subjected to reception processing through regenerating. Parts of signals output from the optical wireless reception unit 210 and the RF wireless transmission/reception unit 220 are tapped by a divider, and signal quality is measured in the signal measurement unit 230.

The control information added by the access control unit 120 in the master station 100 is detected by the optical wireless signal detection unit 231 for the output signal from the optical wireless reception unit 210 and by the RF wireless signal detection unit 232 for the output signal from the RF wireless transmission/reception unit 220. Triggered by the detected control information, the optical wireless signal measurement unit 233 and the RF wireless signal measurement unit 234 measure the signal quality.

The control information is added to each of the head of the frame group of n optical wireless frames and the head of the frame group of k-n RF wireless frames, and hence the frequency to measure the signal quality can be changed depending on the values of n and k. Specifically, the settings can be made such that when $k \leq 10$, the signal quality of all frames is measured, when $10 < k \leq 100$, the signal quality of every other frame is measured, and when $100 < k$, the signal quality of only a frame immediately after control information is measured. The settings can also be made such that when $n \leq k/4$, the signal quality of all frames is measured for the optical wireless frame group and the signal quality of every other frame is measured for the RF wireless frame group. The settings can also be made such that when $k/2 \leq n \leq 3k/4$, the signal quality of every other frame is measured for the optical wireless frame group and the signal quality of all frames is measured for the RF wireless frame group. Note that the number of frames to be measured can be freely set and changed, or may remain unchanged until the next detection of control information. The number of frames to be measured can be set by the terminal 200 or can be set from the master station 100 through control information.

Examples of evaluation of the signal quality of each link include signal to noise ratio (SNR), carrier to noise ratio (CNR), modulation error ratio (MER), error-vector magnitude (EVM), relative constellation error (RCE), bit error rate (BER), and frame error rate (FER).

Measurement values of signal quality are input to the link information generation unit 240. The link information generation unit 240 generates link information in which both of signal quality of signals transmitted through an optical wireless link or an RF wireless link in the downlink direction and measurement parameters are described. The link information has N-bit fields, and, for example, as illustrated in FIG. 4, the signal quality of the RF wireless link and the optical wireless link can be represented by a bit string of 3 bits and measurement parameter information on the signal quality can be represented by a bit string of 2 bits.

Figure 4:
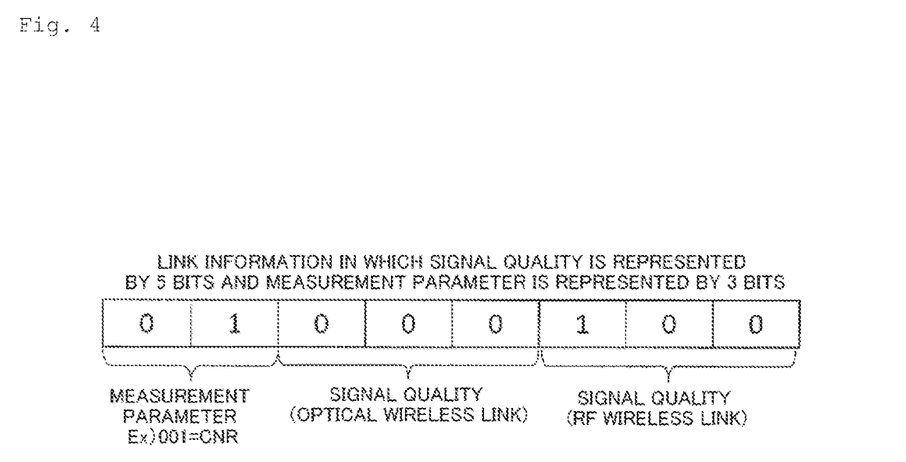
FIG. 4 is an example of link information used by the optical/RF wireless hybrid communication system according to the present invention.
Figure 5:
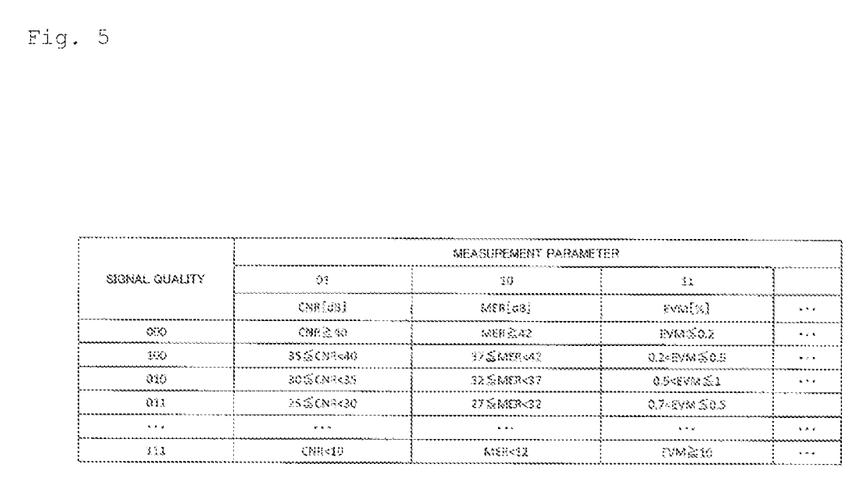
FIG. 5 is a table example of parameters corresponding to signal quality in the optical/RF wireless hybrid communication system according to the present invention.

The table in FIG. 5 indicates the details of the signal quality and the measurement parameters illustrated in FIG. 4 and the correspondence relation thereof. For example, when CNR is used as a parameter, the measurement parameter described in the link information can be set as 01. For example, when CNR is 40 dB or more, 000 is described in the link information as signal quality. Thus, the link information illustrated in FIG. 4 indicates that CNR is used as a measurement parameter, CNR in the optical wireless link falls within the range of CNR≥40, and CNR in the RF wireless link falls within the range of 35≤CNR<40. The bit length in the link information is variable depending on the accuracy of signal quality and the number of measurement parameters, and the allocation of bits to each measurement parameter and signal quality is freely determined. In this manner, the generated link information is input to an RF wireless-side transceiver and transmitted to the master station 100 through the RF wireless link.

Figure 3:
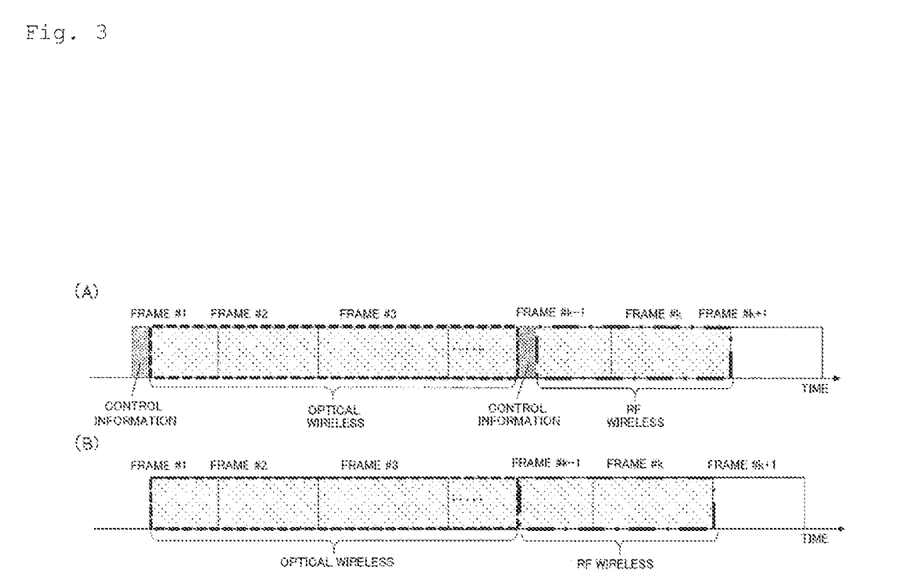
FIG. 3 is a diagram for describing recombination of data performed by the optical/RF wireless hybrid communication system according to the present invention.

Parts of data output from the optical wireless-side transceiver 210 and the RF wireless-side receiver 220 are subjected to buffering processing in the buffer unit 250 and are thereafter recombined in the signal recombination unit 260. FIG. 3 illustrates an example of recombination. First, the signal recombination unit 260 arranges arrived frame groups on the basis of control information as illustrated in FIG. 3(A), and thereafter deletes the control information. In the recombination, the frame groups are constructed again by using the identifiers of the frame groups, the number of frames constituting the frame group, and the number of frames to be actually distributed to the optical or RF wireless link, which are described in the control information. FIG. 3(B) illustrates the frame arrangement after the control information is deleted. In this manner, data recombined by the signal recombination unit 260 is output from the terminal 200.

On the other hand, only the RF wireless link is used for data transmission in the uplink direction. This is a feature of the present invention. By limiting the optical wireless link side to only the downlink direction, the need of an optical transmitter for uploading is eliminated on the terminal side to reduce the cost. This is because as indicated by the total traffic report by the Ministry of Internal Affairs and Communications, the upload traffic is about ⅕ of the download traffic and it is judged that only the RF wireless link is sufficient on the upload side.

Frames in the uplink direction generated inside the terminal 200 or outside the terminal 200 are transmitted by the RF wireless transmission/reception unit 220 to the master station 100 through the RF wireless link 400. In this case, the frames in the uplink direction are multiplied together with link information transmitted from the link information generation unit 240, and are transmitted to the master station 100. In the separation unit 125, the frames received by the RF wireless transmission/reception unit 140 in the master station 100 are subjected to processing for separating the frames in the uplink direction and the link information from each other. The link information separated by the separation unit 125 is input to the distribution determination unit 126.

Figure 6:
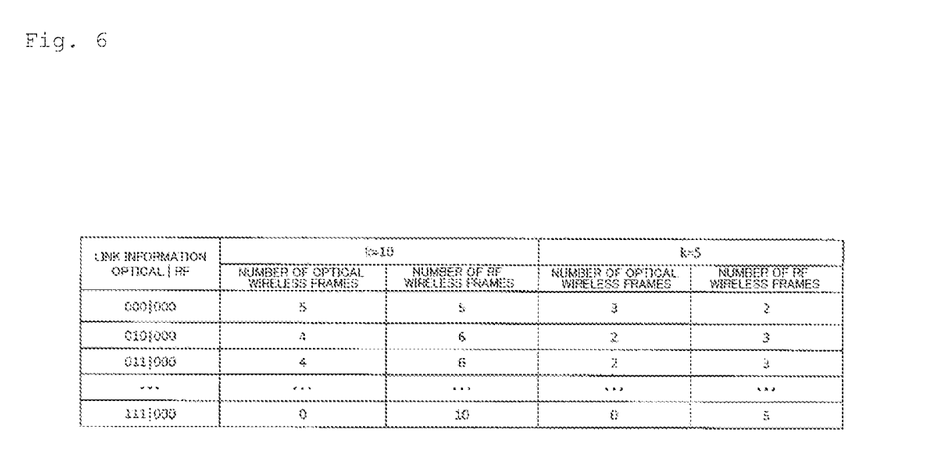
FIG. 6 is a table example of a management information DB in the optical/RF wireless hybrid communication system according to the present invention.

The distribution determination unit 126 generates distribution information for designating the distribution ratio of the link. The distribution information is generated in accordance with the distribution ratio that becomes optimum depending on the signal quality of the link set in the management information DB unit 127 in the form of a database. For example, in the management information DB, a table in which link information on optical and RF wireless links and the number of frames to be distributed to the optical and RF wireless links depending on the number k of frames constituting a frame group blocked in the block formation unit 122 are described as indicated by a table in FIG. 6 is held for each measurement parameter. The distribution ratio is defined depending on the number of frames to be distributed to the optical and RF wireless links. In a frame group constructed by k frames, the distribution ratio is optical wireless frame number n:RF wireless frame number k-n. On the basis of the table, the distribution determination unit 126 determines the number of frames to be distributed from the input actual link information, and transmits the determined number to the control information addition unit as distribution information. The control information addition unit 123 adds control information corresponding to the distribution information to downlink data.

Note that, in the table illustrated in FIG. 5, as long as the correspondence relation between the value of signal quality and the measurement value of each measurement parameter is set such that the signal quality is equivalent among measurement parameters for the same value of signal quality, the table illustrated in FIG. 6 can be used in common among measurement parameters and is not required to be held for each measurement parameter. In this case, in the link information illustrated in FIG. 4, information on the measurement parameters can be omitted.

Data in the uplink direction separated by the separation unit 125 is input to the optical transmission/reception unit 110. The optical transmission/reception unit 110 converts an electric signal from the separation unit 125 into an optical signal, and transmits the optical signal to a host network through the optical fiber transmission line 500.

As described above, in this embodiment, the mechanism of the RF/optical wireless hybrid communication type in which the RF wireless communication type using a frequency band in the radio wave region and the optical wireless communication type using a frequency band in the optical region are blended such that the quality of the link conditions is determined from signal quality of signals received through both channels and the distribution ratio of the links is determined in the master station has been described. By using the configuration in this example, the RF wireless link and the optical wireless link can be dynamically distributed, and the stable wireless communication system independently from the radio conditions and the communication bandwidth can be provided to secure frequency resources in the radio wave region in the wireless transmission section and further increase the throughput.

Note that, in this embodiment, the configuration of the inbound type in which link information is superimposed on an uplink signal and the separation unit 125 separates the link information and the uplink data from each other has been described, but in an outbound type in which different frequencies are used for link information and an uplink signal, the same effects can be obtained by using a bandpass filter for transmitting/blocking a particular frequency instead of the separation unit 125.

(Effects of Invention)

Against the background of diversity of network services and change in lifestyles of end users, the present invention provides the RF/optical wireless hybrid communication type in which the RF wireless communication type of using a frequency band in the radio wave region and the optical wireless communication type of using a frequency band in the optical wave region are blended to secure frequency resources in the radio wave region in the wireless transmission section and increase the throughput, so as to provide the distribution method for determining quality of the link conditions from signal quality received through channels of both the RF wireless link and the optical wireless link and determining the distribution of data to be transmitted through the respective links on the basis of the determination result. Consequently, the stable wireless communication system independently from the radio conditions and the communication bandwidth can be implemented.

REFERENCE SIGNS LIST

| 100 | Master station |
|---|---|
| 110 | Optical transceiver |
| 120 | Access control unit |
| 121 | Buffer unit |
| 122 | Block formation unit |
| 123 | Control information addition unit |
| 124 | Distribution unit |
| 126 | Distribution determination unit |
| 127 | Management information DB unit |
| 130 | Optical wireless-side transmission unit |
| 140 | RF wireless-side transmission/reception unit |
| 200 | Terminal |
| 210 | Optical wireless receiver |
| 220 | RF wireless-side transceiver |
| 230 | Signal quality measurement unit |
| 231 | Optical wireless signal detection unit |
| 232 | RF wireless signal detection unit |
| 233 | Optical wireless signal measurement unit |
| 234 | RF wireless signal measurement unit |
| 240 | Link information generation unit |
| 250 | Buffer unit |
| 260 | Signal recombination unit |
| 270 | Signal intensity measurement unit |

300 RF wireless link
301 Optical/RF wireless hybrid communication system
400 Optical wireless link
500 Fiber transmission line

The invention claimed is:

1. An optical/RF wireless hybrid communication system that transmits frames by using channels of an RF wireless link and an optical wireless link, comprising:
a block formation unit configured to form blocks of a predetermined number of frames as one piece of data; a signal quality measurement unit configured to measure signal quality of frames transmitted through the channel of the RF wireless link and signal quality of frames transmitted through the channel of the optical wireless link; a distribution determination unit configured to determine, on the basis of the signal quality, a distribution ratio of the frames transmitted through the channel of the RF wireless link and the frames transmitted through the channel of the optical wireless link in the data; and a distribution unit configured to divide the data into two pieces on the basis of the distribution ratio, and to distribute one frame group to the channel of the RF wireless link and the other frame group to the channel of the optical wireless link or all frame groups in the data to the channel of the RF wireless link or the channel of the optical wireless link,
a control information addition unit configured to add, to a head of the frame group, control information used for the distribution unit to distribute the frame group to the channel of the RF wireless link and the channel of the optical wireless link,
wherein the signal quality measurement unit is configured to detect the control information and to change a frequency to measure signal quality of a frame on the basis of the distribution ratio.

2. The optical/RF wireless hybrid communication system according to claim 1, wherein, in bidirectional communication, one direction is capable of transmitting the data while distributing the data to the channels of both the RF wireless link and the optical wireless link, and the other direction transmits the data through only the RF wireless link.

3. The optical/RF wireless hybrid communication system according to claim 1 further comprising a database including a table of numbers of frames to be distributed based on the signal qualities of the RF wireless link and the optical wireless link,
wherein the distribution determination unit is configured to determine the distribution ratio using the table.

4. The optical/RF wireless hybrid communication system according to claim 1 wherein the signal quality measurement unit is configured to adjust a frequency of the measurement of the signal quality of the frames transmitted through the channel of the RF wireless link and the signal quality of the frames transmitted through the channel of the optical wireless link based on (a) the number of frames of the data transmitted to the channel of the RF wireless link and (b) the number of frames of the data transmitted to the optical wireless link.

5. The optical/RF wireless hybrid communication system according to claim 1 wherein the signal quality is one of a signal to noise ratio (SNR), a carrier to noise ratio (CNR), a modulation error ratio (MER), an error-vector magnitude (EVM), a relative constellation error (RCE), a bit error rate (BER), and a frame error rate (FER).

6. A control method for controlling an optical/RF wireless hybrid communication system that transmits data by using channels of an RF wireless link and an optical wireless link, the method executing: a block formation procedure for forming blocks of a predetermined number of frames as one piece of data; a signal quality measurement procedure for measuring signal quality of data transmitted through the channel of the RF wireless link and signal quality of data transmitted through the channel of the optical wireless link; a distribution determination procedure for determining, on the basis of the signal quality measured in the signal quality measurement procedure, a distribution ratio of data transmitted through the channel of the RF wireless link and data transmitted through the channel of the optical wireless link in the data; and a distribution procedure for dividing the data into two pieces on the basis of the distribution ratio determined by the distribution determination procedure, and distributing one frame group to the channel of the RF wireless link and the other frame group to the channel of the optical wireless link or distributing all frame groups in the data to the channel of the RF wireless link or the channel of the optical wireless link, a control information addition procedure for adding, to a head of the frame group, control information used in the distribution procedure to distribute the frame group to the channel of the RF wireless link and the channel of the optical wireless link,
wherein the signal quality measurement procedure comprises detecting the control information and changing a frequency to measure signal quality of a frame on the basis of the distribution ratio.

7. The control method according to claim 6, wherein, when the optical/RF wireless hybrid communication system performs bidirectional communication, one direction is capable of transmitting the data while distributing the data to the channels of both the RF wireless link and the optical wireless link, and the other direction transmits the data through only the RF wireless link.

8. The control method according to claim 6 wherein the determining the distribution ratio includes determining the distribution ratio using a table of numbers of frames to be distributed based on the signal qualities of the RF wireless link and the optical wireless link.

9. The control method according to claim 6 further comprising adjusting a frequency of the measurement of the signal quality of the frames transmitted through the channel of the RF wireless link and the signal quality of the frames transmitted through the channel of the optical wireless link based on (a) the number of frames of the data transmitted to the channel of the RF wireless link and (b) the number of frames of the data transmitted to the optical wireless link.

10. The control method according to claim 6 wherein the signal quality is one of a signal to noise ratio (SNR), a carrier to noise ratio (CNR), a modulation error ratio (MER), an error-vector magnitude (EVM), a relative constellation error (RCE), a bit error rate (BER), and a frame error rate (FER).

\* \* \* \* \*